(No Model.) 3 Sheets—Sheet 3.

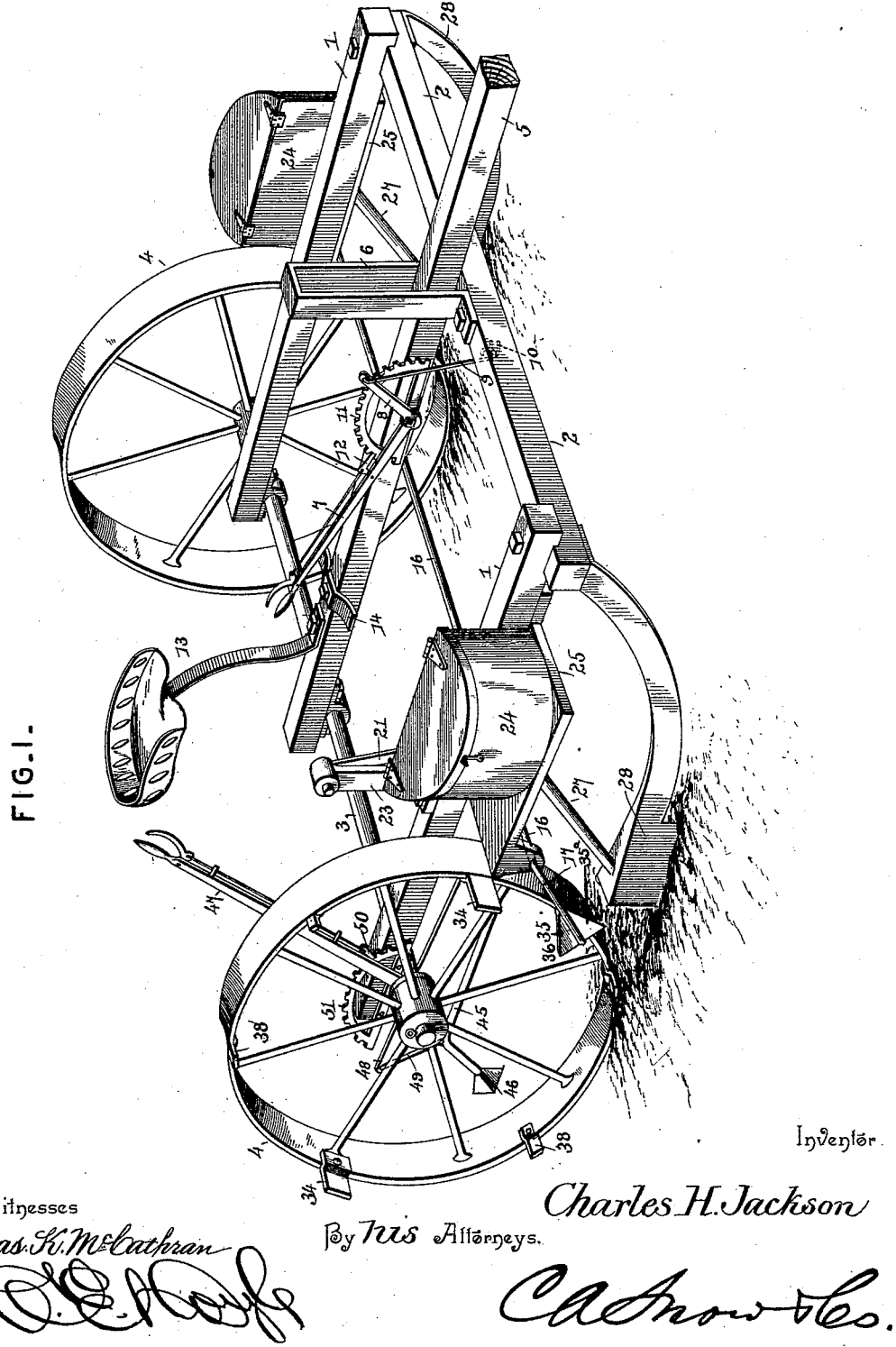

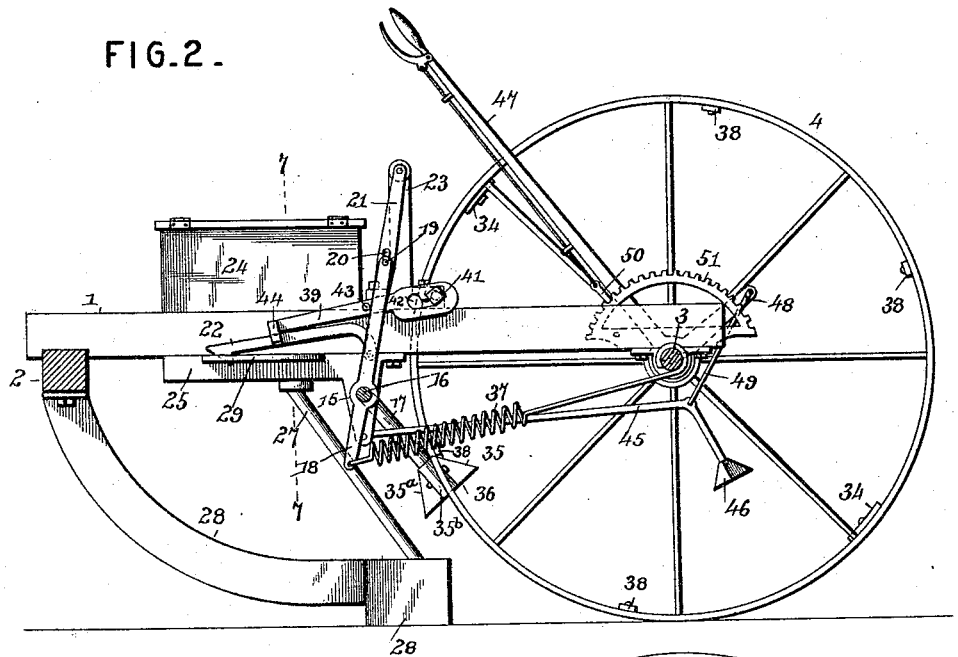
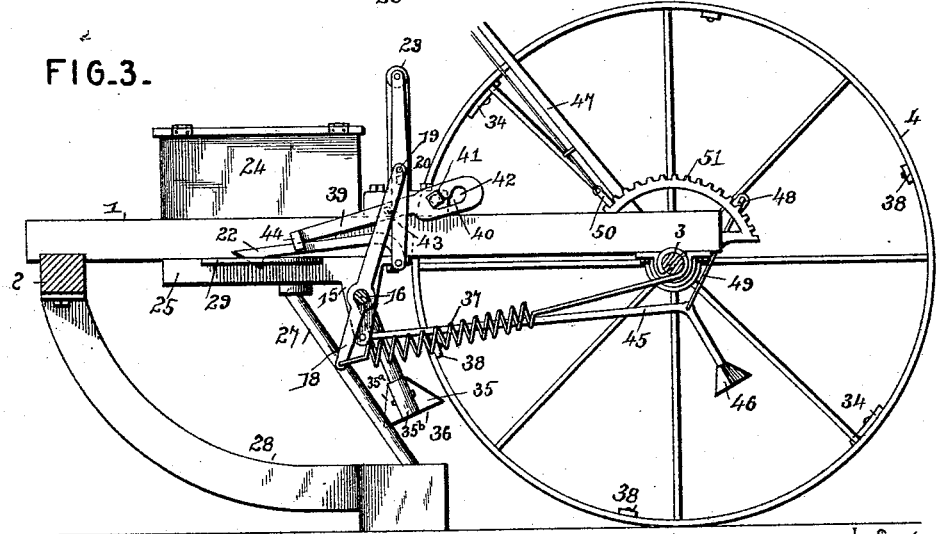

C. H. JACKSON.
CHECK ROW PLANTER AND DRILL.

No. 543,530. Patented July 30, 1895.

Witnesses
Jas. L. McCuthran

Inventor
Charles H. Jackson
By his Attorneys,
C. A. Snow & Co.

UNITED STATES PATENT OFFICE.

CHARLES H. JACKSON, OF ST. JOSEPH, MISSOURI.

CHECK-ROW PLANTER AND DRILL.

SPECIFICATION forming part of Letters Patent No. 543,530, dated July 30, 1895.

Application filed November 10, 1894. Serial No. 528,402. (No model.)

*To all whom it may concern:*

Be it known that I, CHARLES H. JACKSON, a citizen of the United States, residing at St. Joseph, in the county of Buchanan and State of Missouri, have invented a new and useful Check-Row and Drill Corn-Planter, of which the following is a specification.

My invention relates to corn-planters, and particularly to a combined check-row and drill planter, adapted for adjustment to plant either in rows or in drills; and the objects in view are to provide a simple, inexpensive, and efficient combination of devices whereby motion is communicated from a ground-wheel to the planting mechanism; to provide means for locking the feeding apparatus out of operative position; to provide simple means for adjusting the parts to adapt the machine for planting either in rows or in drills, and to provide means for commencing a row at the desired point, in order that the hills may be transversely aligned.

Further objects and advantages of the invention will appear in the following description, and the novel features thereof will be particularly pointed out in the appended claims.

Figure 4:
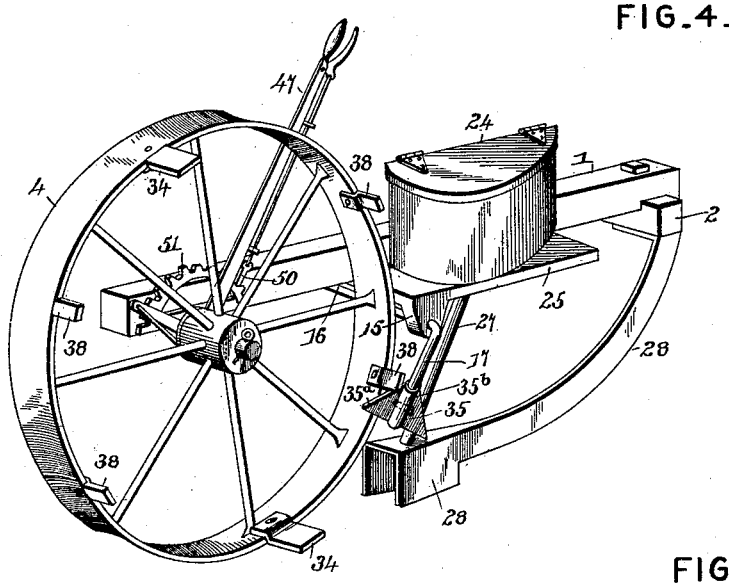
Figure 5:
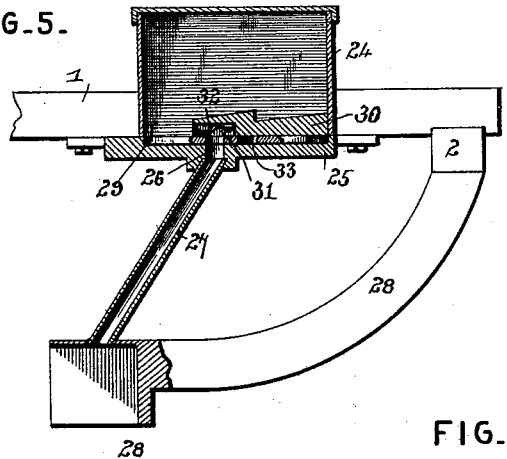
Figure 7:
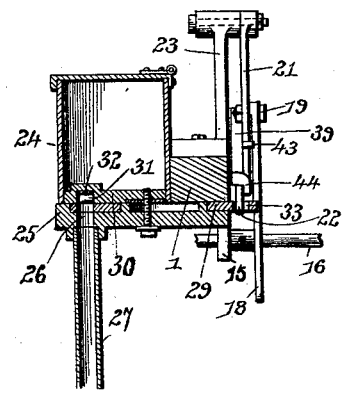
Figure 6:
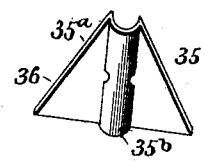

In the drawings, Figure 1 is a perspective view of a corn-planter embodying my invention. Fig. 2 is a vertical longitudinal section of the same, showing the parts in operative positions. Fig. 3 is a similar view showing the parts of the feeding mechanism in their inoperative positions. Fig. 4 is a partial view in perspective showing the apparatus adjusted for planting in drills. Fig. 5 is a detail sectional view of the seed-box, to show the means for preventing the crowding of the grain at the feed-opening thereof. Fig. 6 is a detail view in perspective of the reversible cam for receiving the pressure of the projections on the ground-wheel. Fig. 7 is a vertical section on the line 7 7 of Fig. 2.

Similar numerals of reference indicate corresponding parts in all the figures of the drawings.

1 designates the parallel side beams of the framework, connected at their front ends by a cross-bar 2, attached at their ends to the axle 3, upon the extremities of which are mounted the ground-wheels 4. Swiveled upon the axle, at its center, is the rear end of the tongue 5, which extends through a vertical guide 6 rising from the center of the front cross-bar, and pivotally mounted upon the tongue in rear of said cross-bar is a hand-lever 7, provided with an offset arm 8, which is connected by a link 9 with an eye 10 on said cross-bar. This hand-lever operates in connection with a segmental rack 11 and carries a locking-pawl 12 for engagement therewith, the function of said lever being to adjust the frame with relation to the tongue. The seat-standard 13 is carried by the tongue near its rear end, and in front of the seat-standard is a foot-rest 14.

In suitable bearings 15, depending from the side beams of the frame, is a rock-shaft 16, provided at one end with a crank-arm 17, and attached to this rock-shaft is a rocking lever 18, provided at its upper end with a stud 19, which operates in a slot 20 in the swinging arm 21, said swinging arm carrying the pawl 22 and being pivotally connected at its upper extremity to a vertical standard 23, rising from the adjacent side beam 1. The seed-box 24 is carried by said side beam and is provided with a bottom or floor 25, having an opening 26, which communicates with a seed chute or conductor 27, said chute or conductor terminating at its lower end in the bifurcated rear extremity of the furrow-opening shoe 28. Rotatably mounted upon said main bottom or floor 25 of the seed-box is a perforated seed-disk 29, which projects beyond the inner surface of the side beam, and arranged above the plane of said seed-disk is a false bottom 30, provided in its under surface with a groove or channel 31, communicating with the feed-opening of the main bottom or floor of the seed-box. Arranged in this channel 31 is a spring-guard 32, the free end of which rests upon the surface of the seed-disk and is designed to prevent the crowding of the grain as it approaches the feed opening, and thus prevents the obstruction of the moving parts.

It will be seen that the movement of the rock-shaft will be communicated through the rocking lever and swinging arm to the pawl, which is adapted to engage the perforations 33 in the exposed portion of the seed-disk, thereby imparting a rotary movement to the seed-disk and moving the same at each vibration through an interval corresponding with the distance between two adjacent seed-perforations.

The ground-wheel adjacent to the crank-arm carried by the rock-shaft is provided with a series of check-row projections 34, of which there are two in the construction illustrated in the drawings, said projections being adapted to engage the beveled surface of a wing 35 of the cam 36, attached to said crank-arm. As each check-row projection encounters said beveled surface, the rock-shaft is partially rotated, thereby communicating motion to the seed-disk and causing the latter to discharge the number of seeds necessary for a hill. The parts are returned to their normal positions by means of a return-spring 37, which is attached to the lower extremity of the rocking lever carried by the rock-shaft. Carried by said ground-wheel between the check-row projections are the drill projections 38, which extend outward from the plane of the wheel a less distance than the check-row projections, and which, therefore, do not come in contact with the wing of the cam when the latter is in the position shown in Fig. 1. Said cam is provided, in addition to the wing 35, with a wing 35ª, said wings being arranged in a common plane and being connected by a sleeve 35ᵇ. These wings are arranged upon the same side of the sleeve, and hence when the cam is in the position shown in Fig. 1 the wings are in the plane of the outer side of the crank-arm, and hence in position to be engaged by the check-row projections, but too far from the plane of the ground-wheel to be engaged by the drill projections. When, however, said cam is reversed, as shown in Fig. 4, the wings are arranged in a plane closer to that of the wheel, and the wing 35ª is thus in a position to be engaged by the drill projections as well as the check-row projections. Inasmuch as the drill projections and check-row projections are spaced at equal intervals around the periphery of the wheel, it will be understood that when the cam is in its reversed position, as shown in Fig. 4, the grain will be planted in drills at equal intervals.

The cam which is carried by the crank-arm of the rock-shaft is arranged in such a position with relation to the other parts that the check-row projection which engages the cam and actuates the feeding mechanism will come in contact with the surface of the soil directly opposite the point of the furrow in which the seed planted by said operation of the feeding mechanism was placed, whereby the check-row projections serve the additional function of marker in check-row planting.

In order to provide for throwing the planting mechanism out of operation, I employ a locking-slide 39, provided with a slot 40, arranged in operative relation with a headed pin or stud 41, said slot having terminal offset-notches 42, either of which may be engaged with said pin or stud. The slide is further provided with a stop-pin 43 to limit the movement of the lower end of the swinging arm which carries the pawl, and when the guide pin or stud 41 is in engagement with the forward offset-notch of the locking-slide said swinging arm is held in such position that the cam on the crank-arm of the rock-shaft is out of the path of the projections on the ground-wheel. Said locking-slide is provided at its front end with a hook 44, which rests upon and engages the pawl, thereby weighting the pawl and utilizing the same as a support.

In addition to the above-described mechanism I employ a lifting device or jack, consisting of a pivotal arm 45 having a downturned rear end terminating in a foot or base 46, and a hand-lever 47, provided with an arm 48, which is connected by means of a link 49 with said swinging arm 45 near its rear end. Said hand-lever is provided with a pawl 50 to engage a segmental rack 51 to lock the lever, and hence the other portions of the jack, in the desired positions.

The operation of the mechanism as above described, briefly stated, is as follows: The rotation of the ground-wheel causes the successive engagement of the projections carried thereby with the cam on the crank-arm of the rock-shaft, thus vibrating said arm and the shaft and communicating motion through the connections above described to the seed-disk, whereby as each projection of the ground-wheel encounters the cam the seed-disk is turned to a distance equal to the interval between two adjacent seed-perforations. In order to permit this operation of the parts the locking device must be arranged in such a position that the guide pin or stud is in engagement with the rear offset-notch, thereby releasing the swinging arm which carries the pawl. When it is desired to plant a hill upon a line, in order to secure a transverse alignment of the hills the machine is arranged with the rear end of the shoe upon said line, the jack is operated by moving the free end of its hand-lever to the rear to elevate the adjacent portion of the frame and hence the ground-wheel, after which said ground-wheel is turned until one of its projections is in contact with the beveled edge of the cam. When the ground-wheel is lowered and the machine is moved forward, the planting of a hill occurs immediately, or at the point desired. The adjustment of the front end of the framework with relation to the draft-tongue is for the purpose of varying the depth of furrow formed by the shoe.

In the above description I have referred to only one shoe, seed-disk, and operating connections; but it will be understood, as shown in the drawings, that said parts are duplicated at the opposite side of the framework, with the exception that the rock-shaft receives its motion from a single ground-wheel.

It will be understood that in practice various changes in the form, proportion, and minor details of construction may be resorted to without departing from the spirit of sacrificing any of the advantages of this invention.

Having described my invention, I claim—

1. The combination with a supporting framework, and a furrow opening shoe, of a seed-box, a rotary seed-disk, a rock-shaft, a swinging-arm carrying a pawl for engaging the seed-disk and imparting a step by step movement thereto, a rocking-arm carried by said rock-shaft and operatively connected with the swinging-arm, a locking slide arranged at one end in operative relation with the pawl, provided with a pin to engage the swinging arm and having means for adjustment to remove the pin from engagement with said arm and means for rocking said shaft, substantially as specified.

2. The combination with a supporting framework, and a furrow opening shoe, of a seed-box, a rotary seed-disk, a swinging-arm having a pawl for engaging said seed-disk, a rock-shaft, a rocking-arm having a stud operating in a slot of said swinging-arm, a spring for holding the rocking lever in its normal position, means for imparting motion to the rock-shaft in opposition to said spring, a locking slide resting at one end on said pawl and provided at the other end with a slot having terminal enlargements and arranged in engagement with a stud whereby the slide may be longitudinally adjusted, and a pin carried by the slide to engage and limit the movement of the swinging arm substantially as specified.

3. The combination with a supporting framework, ground-wheels, a furrow opening shoe, a seed-box, and feeding-mechanism, of a rock-shaft operatively connected with the feeding-mechanism and having a crank-arm, a shoe adjustably secured to said crank, and check row and drill projections carried by the ground-wheel adjacent to said crank-arm, said cam being adapted for adjustment to occupy a position in the path of either the check row or drill projections, substantially as specified.

4. The combination with a supporting framework, ground-wheels, a furrow opening shoe, a seed-box and feeding mechanism, of a rock-shaft operatively connected with the feeding-mechanism and having a crank-arm arranged adjacent to the plane of one of the ground-wheels, a cam attached to the said crank arm and capable of adjustment to vary the distance of its wings from the plane of the wheel, and check row and drill projections of different lengths carried by and extending laterally from said ground-wheel, substantially as specified.

5. The combination with a supporting framework, ground-wheels, a furrow opening shoe, a seed-box, and feeding-mechanism, of a rock-shaft operatively connected with said feeding-mechanism and having a crank-arm adjacent to one of said ground-wheels, a cam attached to the crank-arm and provided with oppositely extending wings having beveled edges, said cam being reversible to vary the position of said wings with relation to the plane of said adjacent ground-wheel, and projections of different lengths carried by said ground-wheel and adapted respectively to engage the cam according to the position of the latter, substantially as specified.

In testimony that I claim the foregoing as my own I have hereto affixed my signature in the presence of two witnesses.

CHARLES H. JACKSON.

Witnesses:
LOUIS R. DE VOESS,
J. M. S. LANE.